United States Patent [19]
Chang

[11] Patent Number: 5,975,786
[45] Date of Patent: Nov. 2, 1999

[54] HOIST SWIVEL SHACKLE ASSEMBLY

[76] Inventor: Dong Moon Chang, Dong Chack Ku, Sadang 1 Dong, #1049-14, Seoul, Rep. of Korea

[21] Appl. No.: 08/928,803

[22] Filed: Sep. 12, 1997

[30] Foreign Application Priority Data

May 27, 1997 [KR] Rep. of Korea ............................ 21084

[51] Int. Cl.$^6$ .................................................... F16G 15/08
[52] U.S. Cl. ............................... 403/78; 403/79; 403/27; 116/212
[58] Field of Search ................................. 403/66, 52, 27, 403/78, 79, 268, 267, 269, 265; 116/200, 201, 212, 275; 59/95, 93, 78

[56] References Cited

U.S. PATENT DOCUMENTS

| | | | |
|---|---|---|---|
| 3,347,572 | 10/1967 | Pfaff, Jr. et al. | 403/27 |
| 4,705,422 | 11/1987 | Tsui et al. | 403/78 X |
| 5,103,755 | 4/1992 | Garrett | 116/212 X |
| 5,352,056 | 10/1994 | Chandler | 403/78 X |

Primary Examiner—Lynne Reichard
Assistant Examiner—John R. Cottingham
Attorney, Agent, or Firm—Dillis V. Allen, Esq.

[57] ABSTRACT

A hoist swivel shackle assembly used with others to hoist heavy objects such as dies and molds. The shackle includes a "U" shaped shackle member pivotal on a swivel body which is rotatable about an orthogonal axis on a base. Long term distortion of the shackle member is minimized by flanges on the ends of the legs of the shackle that slidably engage side bosses on the swivel body to absorb outward loading on the shackle. The shackle is pivoted to the swivel body member by a pair of pins with annular recesses, fixed in a pair diametrally opposite pin receiving bores in the swivel body member. These pins are held in the swivel body member by pressing a softened material into threaded bosses in the swivel body forcing it around the pins and into their recesses. Overloading the swivel shackle assemblies is minimized by an indicator that tells the operator when he has exceeded the safety angle of the shackle member.

13 Claims, 2 Drawing Sheets

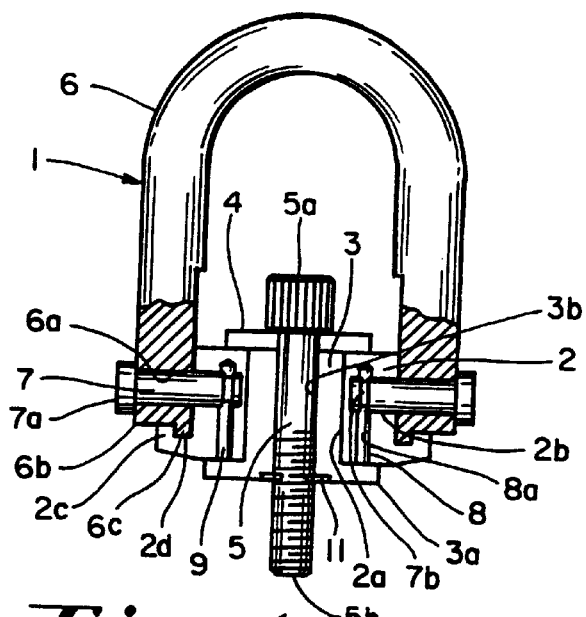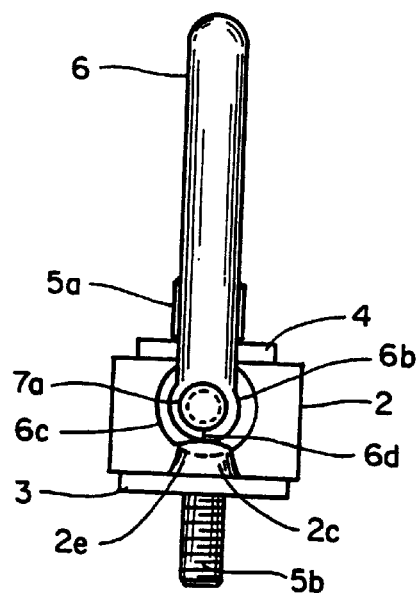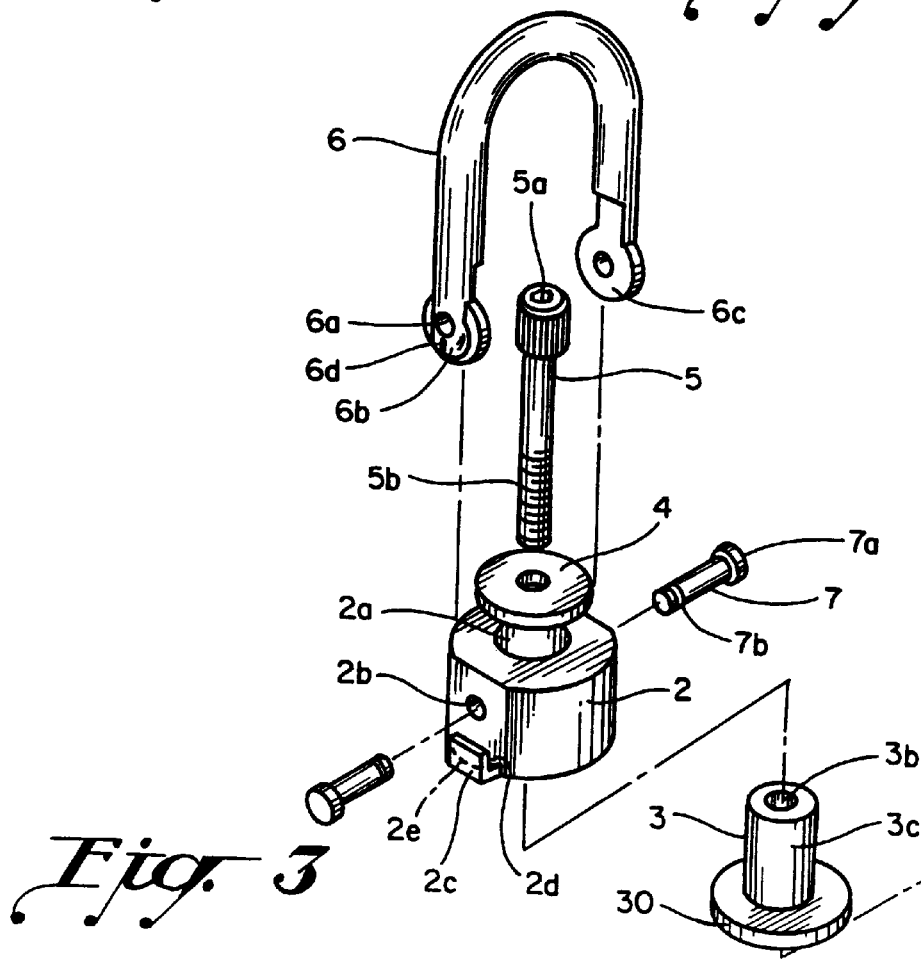

HOIST SWIVEL SHACKLE ASSEMBLY

BACKGROUND OF THE PRESENT INVENTION

Swivel shackle assemblies have been used for many years in conjunction with cables and a hoist to lift and move heavy objects about the workplace, such as dies, molds, heavy castings, etc. These swivel shackle assemblies typically include a "U" shaped shackle member that is pivotal on a swivel body that in turn is rotatable about an axis on a base that is perpendicular to the swivel axis of the shackle on the base. This enables the shackle to accommodate two axes pivotal movement which is necessary for the geometry of the hoist arrangement.

In a typical hoist arrangement, an overhead crane has a depending single cable that is tied to four(more or less) outwardly extending cables connected to the shackle assemblies. Each shackle assembly typically has a threaded fastener extending centrally there-through that bolts the shackle directly to the top surface of the die or mold.

There have been found to be several problems associated with these prior shackle assemblies that we have observed over many years of manufacturing and testing these shackles. The first is that the "U" shaped shackle member that includes generally spaced parallel legs that are pinned at their ends to the swivel body, tend to spread apart after either extensive use, or sometimes upon overloading. To our knowledge no solution has, prior to the present invention, been devised for either ameliorating or eliminating this very fundamental problem.

A second problem results in the improper design of the hoisting arrangement by the hoist operator or his assistants. As noted above, each of the shackles is tied to a single hoist cable by an angularly related branch cable, and it can be simply shown that the load on each of the shackles is proportional to the angle of the shackle branch cables to a vertical axis. That is, as the angle of the shackle branch cable increases with respect to the vertical axis, the load on the shackle increases for a pre-determined load mass, which of course is a vertical load. To our knowledge, none of the shackle assemblies previously devised has provided the operator with any warning or indication as to an unsafe angle on the shackle member, that may cause failure of the shackle assembly.

The following patents are representative of the prior art relating to dual axis hoist shackle assemblies.

The Andrewe, et al., U.S. Pat. No. 3,297,293, issued Jan. 10, 1967; the Tsui, et al., U.S. Pat. No. 4,705,422, issued Nov. 10, 1987; and the Chandler, U.S. Pat. No. 5,352,056, issued Oct. 4, 1994, all show swivel shackle assemblies having a "U" shaped member or shackle that is pinned to a rotary swivel member by transverse pins that are separate from the "U" member itself. In this design, it is necessary to fix these shackle pins in the swivel body, and this design is particularly prone to "U" members spreading either as a result of long term fatigue or overloading.

A second group of patents represented by the Wong, et al., U.S. Pat. No. 4,570,987, issued Feb. 18, 1996; the Tsui, et al., U.S. Pat. No. 4,641,986, issued Feb. 10, 1987; and the Tsui, U.S. Pat. No. 5,405,210, issued Apr. 11, 1995, show hoist swivel shackle assemblies in which the ends of the "U" shaped shackle extend radially inwardly and form the pivotal bosses for the shackle on the swivel body member. This design somewhat reduces the long term loading problem on the shackle discussed above, but it does not significantly minimize that problem.

Furthermore, in none of the prior swivel shackle assemblies discussed above is there any provision for a device that indicates to the operator when an excessive shackle angle is placed on the shackle causing a potentially hazardous condition.

It is a primary object of the present invention to ameliorate the problems noted above in hoist swivel shackle assemblies.

SUMMARY OF THE PRESENT INVENTION

In accordance with the present invention, a new and improved swivel shackle assembly is provided, as well as a method for its manufacture, that with others in tandem is utilized to hoist heavy objects such as tools, molds, and dies.

The shackle assembly includes a "U" shaped shackle member pivotal on a swivel body which is in turn rotatable on a base about an axis orthogonal to the pivotal axis of the shackle member on the swivel body. In this way the shackle assembly has freedom of movement in two axes and the "U" shaped shackle provides a convenient attachment location for a cable coupling associated with the hoisting arrangement. Typically, such a hoisting arrangement would include a primary vertical cable descending from the hoist or crane and two, four or more outwardly diverging branch cables having ends connected to the individual shackles which are fixed by bolts directly to the tool or die to be lifted and moved. As noted above, excessive angles on the branch cables create a safety overload problem on the shackle assemblies.

A principle object of the present invention is to ameliorize and reduce the tendency of the "U" shaped shackle which generally has spaced parallel legs flanking the swivel body, and particularly their legs, to spread outwardly after long term stressing or even by isolated overloading. This problem is minimized by the provision of flanges formed integrally on the ends of the shackle legs that slidably engage bosses extending diametrally outwardly and integrally from the swivel body, that absorb outward loading on the shackle legs.

To further enhance the structural integrity of these swivel shackle assemblies, the pins that rotatably support the "U" shaped shackle on the swivel body member, are held in the body member in a unique and higher strength fashion than provided by the simple roll pins or snap rings in the prior art. Toward these ends, these shackle pins are provided with annular recesses spaced from their ends that lie in the path of threaded apertures that extend upwardly through the swivel body that cross the bores in the shackle body that receive these pins.

After the pins and shackle have been assembled to the swivel body, a low tensile metal material, or a high strength thermoplastic material, or certain mixtures thereof, all softened by heating, is pressed into these threaded bores and forced around the pins so the material flows integrally into the pin annular recesses and after cooling provides a locking arrangement that is far superior to simple roll pins or snap rings heretofore provided in the art.

As discussed above, when the shackle angle is increased beyond a critical angle to vertical, there is created a danger that the swivel assembly will fail under loading. Generally, this swivel assembly overloading occurs when the branch cables to the swivel assemblies have an angle to vertical of 45 degrees or more.

According to the present invention, indicia are provided on the legs of the shackle that cooperate with indicia on the swivel bosses that indicate to the operator when the shackle has exceeded this 45 degree safety limitation.

Other objects and advantages of the present invention will appear more clearly from the following detailed description.

BRIEF DESCRIPTION OF THE DRAWINGS

FIG. 1 is a front view of the present hoist swivel shackle assembly with its lower portion fragmented by a longitudinal section;

FIG. 2 is a side view of the hoist swivel shackle assembly illustrated in FIG. 1;

FIG. 3 is an exploded perspective of the hoist swivel shackle assembly illustrated in FIGS. 1 and 2;

DETAILED DESCRIPTION OF THE PREFERRED EMBODIMENT

Figure 4:
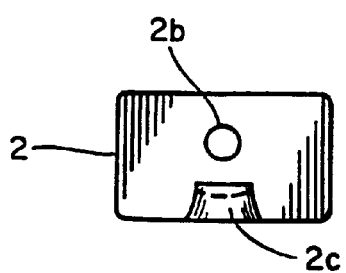
FIG. 4 is a left side sub-assembly view of the swivel body member illustrated in FIGS. 1 and 3.

Viewing the drawings and particularly FIGS. 1 to 3 and 9, a hoist swivel shackle assembly 1 is illustrated generally including a bushing base 3, that rotatably receives a swivel body 2, clamped together by a threaded stud 5, a clamping washer 4, and a generally "U" shaped shackle member 6, that is pivotally mounted on the swivel body 2 by a pair of diametrally coaxial headed pins 7 generally of the clevis type. The stud 5 has a head 5a and a lower threaded portion 5b adapted to be received in a cooperating threaded bore in the work load(not shown), such as a tool or die, that along with other swivel assemblies 1, and an associated hoist and cable arrangement are utilized to lift the load and move it about the work factory.

The clevis type pins 7 define a first pivotal axis for the present shackle, while the axis of the bushing base 3 and the stud 5 define a second axis of movement for the present assembly that is intersected by and orthogonal to the first swivel or pivotal axis. With these two axes of movement and cables connected through the shackles 6, a plurality of swivel shackle assemblies can be cabled to a single vertical hoist cable to form a lifting arrangement for an associated load.

The base 3, swivel body 2, washer 4, stud 5, and shackle 6, are constructed of various steel alloys and selected optimally for their machining, forging, and load bearing characteristics as will appear to those with skill in this art.

The bushing 3 has a lower flange portion 3a and a sleeve portion 3c that has a central axial through bore that receives the threaded shank 5b of stud 5. The flange portion 3a slidably engages the lower surface of the swivel body 2 while the washer 4 slidably engages the upper surface of the swivel body 2 to permit rotation of the swivel body 2 on the base 3 and to clamp the four parts together as a unit when the stud 5 is threaded into the associated load. The snap ring 10 holds this assembly together when not threaded into the load.

As noted above, the shackle 6 is pivotally mounted on the swivel body by locking pins 7 that have annular recesses 7b spaced a short distance from their ends. Pins 7 are received in bores 6a in the legs 6b of the shackle. Legs 6b are parallel and spaced from one another as clearly indicated in FIG. 1. Pins 7 have heads 7a.

Figure 5:
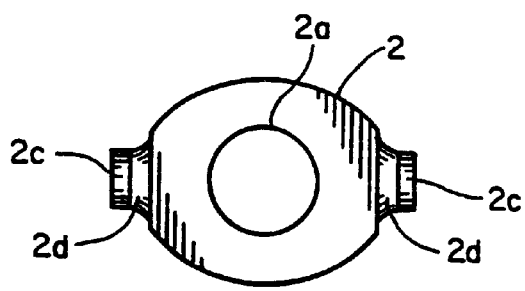
FIG. 5 is a top view of the swivel body member illustrated in FIG. 4.
Figure 6:
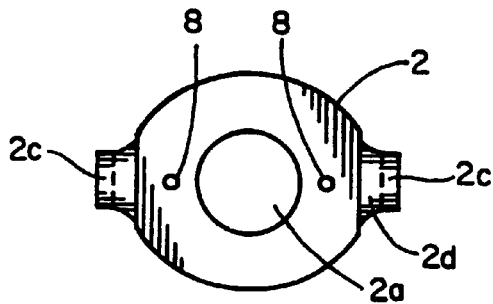
FIG. 6 is a bottom view of the swivel body member illustrated in FIGS. 4 and 5.

As seen more clearly in FIGS. 4 to 6, the swivel body is provided with a pair of diametrically opposite integrally formed radially outwardly extending bosses 2c that are generally "L" shaped in configuration that each have recesses 2d therein that are congruent with and slidably receive arcuate flanges 6c integrally formed on the ends of the shackle legs 6b. The outer surfaces of the flanges 6c are formed on a circle about the pivotal axis of the pins 7 as are the lower surfaces of the receiving recesses 2d so that close engagement is made between the flanges 6c and the recesses 2d throughout the range of motion of the shackle 6 on the swivel body 2. In this manner, the side bosses 2c rigidly and securely resist any tendency for the shackle legs to migrate outwardly along the axis of pins 7 either due to repeated long term cycle stressing, or to excessive loading.

Another important aspect of the present invention is the manner of locking the pins 7 axially in the swivel body 2, and particularly in the diametrally aligned bores 2b therein that receive these pins.

Figure 7:
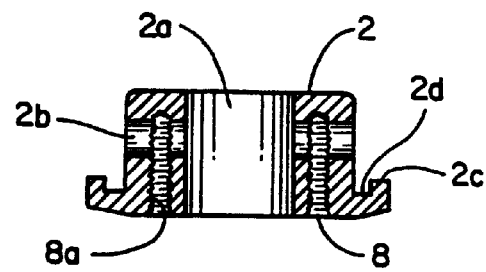
FIG. 7 is a longitudinal section through the swivel body member illustrated in FIGS. 4 to 6.
Figure 8:
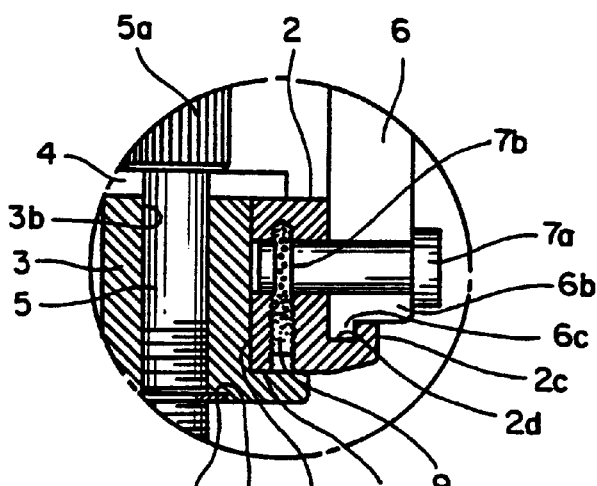
FIG. 8 is an enlarged fragmentary section of the lower right side of the fragmented portion of the swivel shackle assembly illustrated in FIG. 1.
Figure 9:
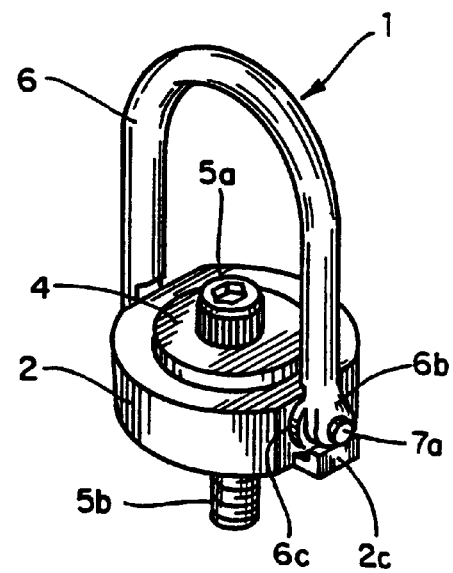
FIG. 9 is a perspective view of the hoist swivel shackle assembly shown in FIGS. 1 to 8.

Toward these ends and as seen in FIGS. 1, 7 and 8, a pair of threaded bores 8a extend upwardly in the swivel body 2 and centrally intersect the cross bores 2b that receive the pins 7.

In the manufacture of the present swivel shackle assembly, after the shackle 6 has been pinned to the swivel body 2 by the pins 7, and prior to the assembly of the swivel body 2 to the base 3, a low tensile metal material, or a high strength thermoplastic material 9, or certain mixtures thereof, all softened by heating, is pressed into the threaded bores 8, sufficiently so that the material flows in softened form, flows around the pins 7, into the annular recesses 7b and into the upper end of the bores 8, as well as into the threads 8a of the bores 8. After cooling, the material 9 is integral and of complex shape defining a superior snap ring type locking action on the pins 7, but one that is far stronger.

Both ferrous, non-ferrous metals, and highly engineered plastics can be utilized for this material. Ferrous metals using for fixing pin contain Carbon below 0.3% and have a shape of small round bar or wire. It is put into a closed container which has no oxygen, and heated up and maintained at the temperature between 1,202 F and 1,382 F for 12 hours. After 12 hours pass, the material cools off gradually in a furnace. This kind of heat treatment is called "Box Annealing". During the process of annealing, cementite structure of the material become spherule. This softened material has hardness figure below 50 Hb (Brinell Hardness). To insert a round shaped material into the slot, 15 ton power hydraulic press equipment is used.

Many non-ferrous metals can be used. However, the most preferred materials are Copper and Aluminum alloys which have 99% purity. The round bar shaped Copper is heated up to around 932 degrees F and maintains this temperature for 5 hours in a container with no oxygen. Then it cools off in the furnace. By heating up the material for 5 hours at around 932 degrees F, the inner stress of Copper bar or wire which is formed in the process of drawing, is removed. In case of Aluminum, the applied temperature is 734 degrees F and necessary time for heating is 3 hours. For the purpose of pressing the material into the slot, 5 ton power hydraulic press equipment is used.

Besides these materials, a lot of combined alloys can be applied. Ferrous metals are recommended for fixing pins strongly and when it is not necessary to disassemble the device itself.

Many kinds of plastic materials can be used. There are two main groups: engineering thermoplastics and thermosets. One of the preferred materials among engineering thermoplastics is polycarbonate. To use polycarbonate material for fixing side pins, it should be heated up to its melting point which is ranged between 510 and 536 degrees F. A small plastics injection machine or equipment will inject the material into the slots formed in swivel body member with the pressure of 150 lb/in$^2$. After it cools off, polycarbonate material holds side pins and body strongly altogether by its mechanical characters. When it is necessary to disassemble parts, it should be heated up above 550 degrees F. Polycarbonate can be removed from the slot easier than ferrous and non-ferrous metals.

There are also many kinds of mixtures to use besides ferrous, non-ferrous metals and plastics. 10% of Pure steel (Fe) powder(density between 6.2 and 7.0—JIS1015) is mixed with 90% of polycarbonate when it is injected into the slots formed in the swivel body as mentioned at the above Plastics material sections. The pressure that is being applied is same as plastics, 150 lb/in. After it cools off, the side pin is held by the mechanical characters of polycarbonate and resistance character of the steel powder. When it is necessary to disassemble, it should be heated up beyond 550 degrees F.

Besides the above materials, a lot of combined alloys can be applied. Ferrous and non-ferrous metals are recommended for fixing pins strongly and when it is not necessary to disassemble the device itself. Plastics and mixtures are preferred to be used when the device is needed to be disassembled anytime for inspections of parts or changing parts.

As noted above, an indicator system is provided according to the present invention that indicates to the operator when the shackle 6 has exceeded its safety angle of about 45 degrees with respect to the axis of the stud 5. Toward this end, a plurality of notch marks 2e are provided on the outer surfaces of the swivel body side bosses 2c. These notches include a first notch coincident with the axis of the stud 5 and three notches on each side thereof representing 15 degree increments so that the outer notches represent a 45 degree angle with respect to both the axis of the pins 7 and a vertical axis. These notch marks 2e cooperate with an arrow marker or notch 6d in the lower arcuate ends of the shackle legs 6b. When the arrow indicator 6b is moved beyond the outside 45 degree notches 2e, the operator is informed that the shackle 6 has moved beyond its 45 degree safety angle and should be moved back to a position where arrow 6d is inside the outer ones of the notches 2e. Information regarding this safety feature is provided to the operator along with other safety functions for safe hoisting procedures.

I claim:

1. A swivel shackle assembly for lifting heavy loads, comprising: a swivel body member rotatable about a swivel axis on a base, a generally "U" shaped shackle member having leg portions and inwardly projecting pin portions received in spaced aligned bores in the swivel body rotatable about an axis perpendicular to the swivel axis, and means separate from the pin portions to reduce outward distortion movement of the leg portions including interengaging means on the swivel body member and shackle member adjacent the shackle member leg portions for limiting movement of the shackle member leg portions outwardly away from the swivel body, said "U" shaped shackle member leg portions being parallel to each other and interconnected by a bight portion, said leg portions having ends from which the pin portions project inwardly, said interengaging means including a flange defined about the pin portion axis on one of the swivel body member and the "U" shaped shackle member leg portions, and a recess receiving flange formed on the other member, said flange and recess extending perpendicular to the axes of the spaced aligned bores in the swivel body.

2. A method of manufacturing a swivel shackle assembly of the type having a body member rotatable about a swivel axis on a base, a generally "U" shaped shackle member having leg portions and inwardly projecting pin portions received in spaced aligned pin receiving bores in the swivel body rotatable about an axis perpendicular to the swivel axis, including forming the swivel body with a pair of bores intersecting the pin receiving bores in the swivel body, inserting the shackle pin portions into the swivel body pin receiving bores, and pressing a softened material into the intersecting bores causing the material to flow around the pin portions preventing outward movement of the pin portions in the swivel body pin receiving bores.

3. A method of manufacturing a swivel shackle assembly as defined in claim 2, including forming the intersecting bores in the swivel body with threads to lock the material in the intersecting bores.

4. A method of manufacturing a swivel shackle assembly as defined in claim 2, including forming the shackle pin portions with annular grooves located to be aligned with the intersecting bores when the shackle member is assembled to the swivel body, said step of pressing the softened material including pressing the material sufficiently to flow completely around the pin portions and in the annular grooves therein.

5. A swivel shackle assembly for lifting heavy loads, comprising: a swivel body member rotatable about a swivel axis on a base, a generally "U" shaped shackle member having leg portions and inwardly projecting pin portions received in spaced aligned bores in the swivel body rotatable about an axis perpendicular to the swivel axis, and means to axially lock the pin portions in the receiving bores in the swivel body including a pair of bores in the swivel body intersecting the pin portion receiving bores, and a high strength pressed material in the intersecting bores having portions flowed around the pin portions to axially lock the pin portions.

6. A swivel shackle assembly for lifting heavy loads as defined in claim 5, including said intersecting bores being threaded, said pin portions having an annular recess therein aligned with the intersecting bores, said pressed material having material portions flowed into the threaded intersecting bores and second portions flowed around the pin portions and into the annular recesses to axially lock the pin portions.

7. A swivel shackle assembly for lifting heavy loads as defined in claim 5, including indicia on the shackle member and on the swivel body member to show the operator the swivel shackle assembly has exceeded a safety angle.

8. A swivel shackle assembly for lifting heavy loads as defined in claim 1, including indicia on the shackle member and on the swivel body member to show the operator the swivel shackle assembly has exceeded a safety angle.

9. A swivel shackle assembly for lifting heavy loads as defined in claim 1, further comprising a means to minimize the operator's positioning of the shackle member at an angle relating to the swivel body member above a predetermined safety angle that may cause damage to the shackle assembly and create a safety hazard including said shackle member being pivotal on the swivel member to an angle substantially above the safety angle and cooperating indicia on the shackle member and the swivel body member that indicates to the operator when the safety angle has been reached or exceeded.

10. A swivel shackle assembly for lifting heavy loads as defined in claim 9, wherein the safety angle is 45 degrees and the indicia indicates the 45 degree angle.

11. A swivel shackle assembly for lifting heavy loads as defined in claim 5, wherein the high strength material is a high strength thermoplastic material that when heated permits the disassembly of the swivel shackle assembly.

12. A method of manufacturing a swivel shackle assembly as defined in claim 2, wherein the step of pressing a softened material into the intersecting bores includes heating a high strength thermoplastic material and injecting the softened material into the intersecting bores.

13. A method of manufacturing and disassembling a swivel shackle assembly of the type having a body member rotatable about a swivel axis on a base, a generally "U" shaped shackle member having leg portions and inwardly projecting pin portions received in spaced aligned bores in the swivel body rotatable about an axis perpendicular to the swivel axis, including forming the swivel body with a pair of bores intersecting the pin receiving bores in the swivel body, inserting the shackle pin portions into the swivel body receiving bores, pressing a material into the intersecting bores causing the material to flow around the pin portions preventing outward movement of the pin portions in the swivel body pin portion receiving bores, the step of pressing the material into the intersecting bores includes heating a high strength thermoplastic material and injecting the material into the intersecting bores, and disassembling the swivel shackle assembly including the step of heating the thermoplastic material and removing substantial portions thereof from the intersecting bores.

\* \* \* \* \*